United States Patent
Zeng et al.

(10) Patent No.: US 11,252,148 B2
(45) Date of Patent: Feb. 15, 2022

(54) SECURE WEB APPLICATION DELIVERY PLATFORM

(71) Applicant: CITRIX SYSTEMS, INC., Fort Lauderdale, FL (US)

(72) Inventors: Zhen Zeng, Nanjing (CN); Hongfei Wu, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 325 days.

(21) Appl. No.: 16/435,005

(22) Filed: Jun. 7, 2019

(65) Prior Publication Data
US 2020/0374281 A1 Nov. 26, 2020

Related U.S. Application Data

(63) Continuation of application No. PCT/CN2019/088134, filed on May 23, 2019.

(51) Int. Cl.
| | | |
|---|---|---|
| *H04L 29/06* | (2006.01) | |
| *G06F 16/958* | (2019.01) | |
| *H04L 67/146* | (2022.01) | |
| *H04L 67/02* | (2022.01) | |
| *H04L 67/141* | (2022.01) | |
| *G06F 9/445* | (2018.01) | |

(52) U.S. Cl.
CPC ...... *H04L 63/0853* (2013.01); *G06F 9/44526* (2013.01); *G06F 16/986* (2019.01); *H04L 67/02* (2013.01); *H04L 67/141* (2013.01); *H04L 67/146* (2013.01)

(58) Field of Classification Search
CPC ... H04L 63/0853; H04L 67/02; H04L 67/141; H04L 67/146; G06F 16/986; G06F 9/44526

USPC .......................................................... 726/6
See application file for complete search history.

(56) References Cited

U.S. PATENT DOCUMENTS 8,392,702 B2   3/2013  Qiu et al.
10,296,558 B1 * 5/2019 McInerny ............. G06F 40/131
(Continued)

FOREIGN PATENT DOCUMENTS

CN   102638454 A   8/2012
WO   2017059400 A1  4/2017

OTHER PUBLICATIONS

International Search Report and Written Opinion dated Mar. 2, 2020 for Application No. PCT/CN2019/088134 filed May 23, 2019; pp. 9.

*Primary Examiner* — Jacob Lipman
(74) *Attorney, Agent, or Firm* — Hoffman Warnick LLC (57) ABSTRACT

A network service, program product and method that manages secure web application delivery. A service is disclosed that includes an interface configured to receive a request for a secure web application from a plug-in integrated into a web browser on a client computing device, wherein the request further includes a user credential token. Also included is a token processor that evaluates the user credential token and determines an associated customer domain server provided by a back-end service and a transport service that establishes a secure channel with the customer domain server, and forwards the request to the associated customer domain server and receives back a text-based data package. Once generated, the text-based data package is forwarded to the plug-in in response to the request.

20 Claims, 4 Drawing Sheets

(56) References Cited

U.S. PATENT DOCUMENTS

| | | | |
|---|---|---|---|
| 2009/0106296 A1* | 4/2009 | Sickmiller | G06F 16/955 |
| 2014/0337405 A1* | 11/2014 | Athas | H04L 67/2838 |
| | | | 709/203 |
| 2016/0142438 A1 | 5/2016 | Pastore et al. | |
| 2016/0205089 A1 | 7/2016 | Ott et al. | |
| 2020/0250323 A1* | 8/2020 | Remington | G06F 16/972 |

* cited by examiner

SECURE WEB APPLICATION DELIVERY PLATFORM

BACKGROUND OF THE DISCLOSURE

Web security remains an ongoing concern when provisioning web applications for end users. One common approach to address security issues is to provide a virtualized environment in server, e.g., as virtual machines (VMs). Using this approach, the resulting browser application is streamed from the server to the client over a network. By providing such a virtualized environment, the enterprise can maintain ownership and control of browser implementation and more effectively achieve a secure platform.

BRIEF DESCRIPTION OF THE DISCLOSURE

Aspects of this disclosure provide a cloud service for managing delivery of a secure web application to a non-virtualized browser. Virtualized browsers may require a large amount of computational overhead that can limit performance. For example, when delivering web applications, image data and the like needs to be encoded, transported and decoded over a virtual channel. Such an environment thus may require a substantial amount of bandwidth and computing power, which may not always be available. The present approach provides a technical solution that improves the operation of a network, such as the World Wide Web, in delivering secure web applications while achieving high performance, without requiring the overhead of virtualized browsers.

A first aspect of the disclosure provides a software plug-in configured for integration into a web browser. The plug-in includes a request hook that intercepts web browser requests associated with a secure web application. Once intercepted, a request processing system redirects an initial request for the secure web application to a network service, and also redirects subsequent HTTP requests to interact with the secure web application to the network service. A package manager receives a text-based data package from a customer domain server in response to the initial request and utilizes the text-based data package to render the secure web application in the web browser, and receives an updated text-based data package from the customer domain server in response to the subsequent HTTP request and renders updates to the secure web application in the web browser.

A second aspect of the disclosure provides a back-end service for processing secure web applications. The back-end service includes an interface configured to receive a request associated with a secure web application from a network service. One of a set of selectable customer domain servers is selected by the network service based on a user credential token and a server browser assistant executes the secure web application within a selected customer domain server. A packager generates a text-based data package based on an execution of the secure web application by the server browser assistant and the interface forwards the text-based package back to the network service.

A third aspect of the disclosure provides a platform for delivering secure web applications. The platform includes a back-end service for processing secure web applications that includes an interface configured to receive requests associated with secure web applications from a network service and a set of customer domain servers that are selectable by the network service based on a user credential token. A server browser assistant executes a secure web application specified by the network service within a selected customer domain server and a packager generates a text-based data package based on an execution of the secure web application by the server browser assistant and forwards the text-based package back to the network service. The platform further includes a software plug-in configured for integration into a web browser, having: a request hook that intercepts web browser requests associated with designated secure web applications; a request processing system that redirects an initial request for the secure web application to the network service; and a package manager that receives the text-based data package from the network service in response to the initial request and utilizes the text-based data package to render the secure web application in the web browser.

A fourth aspect of the disclosure provides a computerized method for processing secure web applications. The method includes receiving a request associated with a secure web application from a network service and utilizing a selected customer domain server from a set of selectable customer domain servers to process the request based on a designation by the network service. The method executes the secure web application using a server browser assistant within the selected customer domain server and generates a text-based data package based on an execution of the secure web application by the server browser assistant. The text-based package back is then forwarded back to the network service.

A fifth aspect of the disclosure provides a network service that includes an interface configured to receive a request for a secure web application from a plug-in integrated into a web browser on a client computing device, wherein the request further includes a user credential token. Also included is a token processor that evaluates the user credential token and determines an associated customer domain server provided by a back-end service and a transport service that establishes a secure channel with the customer domain server, and forwards the request to the associated customer domain server and receives back a text-based data package. Once generated, the text-based data package is forwarded to the plug-in in response to the request.

A sixth aspect of the disclosure provides a computer program product stored on a computer readable medium, which when executed by a processor implements a network service. Included is program code configured to receive a request for a secure web application from a plug-in integrated into a web browser on a client computing device, wherein the request further includes a user credential token. Also included is program code that evaluates the user credential token and determines an associated customer domain server provided by a back-end service and program code that establishes a secure channel with the customer domain server, and forwards the request to the associated customer domain server and receives back a text-based data package. Once received, the text-based data package is forwarded to the plug-in in response to the request.

A seventh aspect of the disclosure provides a computerized method of utilizing a network service. The method includes receiving a request for a secure web application from a plug-in integrated into a web browser on a client computing device and receiving a user credential token with the request. The method further includes evaluating the user credential token to determine an associated customer domain server provided by a back-end service and establishing a secure channel with the customer domain server and forwarding the request to the associated customer domain server. The method further includes receiving back a text-based data package from the customer domain server and forwarding the text-based data package to the plug-in in response to the request.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide a lightweight solution to delivering secure web applications while achieving high performance. In particular, described embodiments provide: a plug-in that hooks a secure web application request originating from a standard client browser; redirects the request, via a cloud service, to a server that executes the request and captures the results; and returns a text-based file back to the client browser in a format that can be easily rendered. This process improves the technical operation of a computing platform by reducing network latency, increasing security, and eliminating the need for a virtualized browser.

Figure 1:
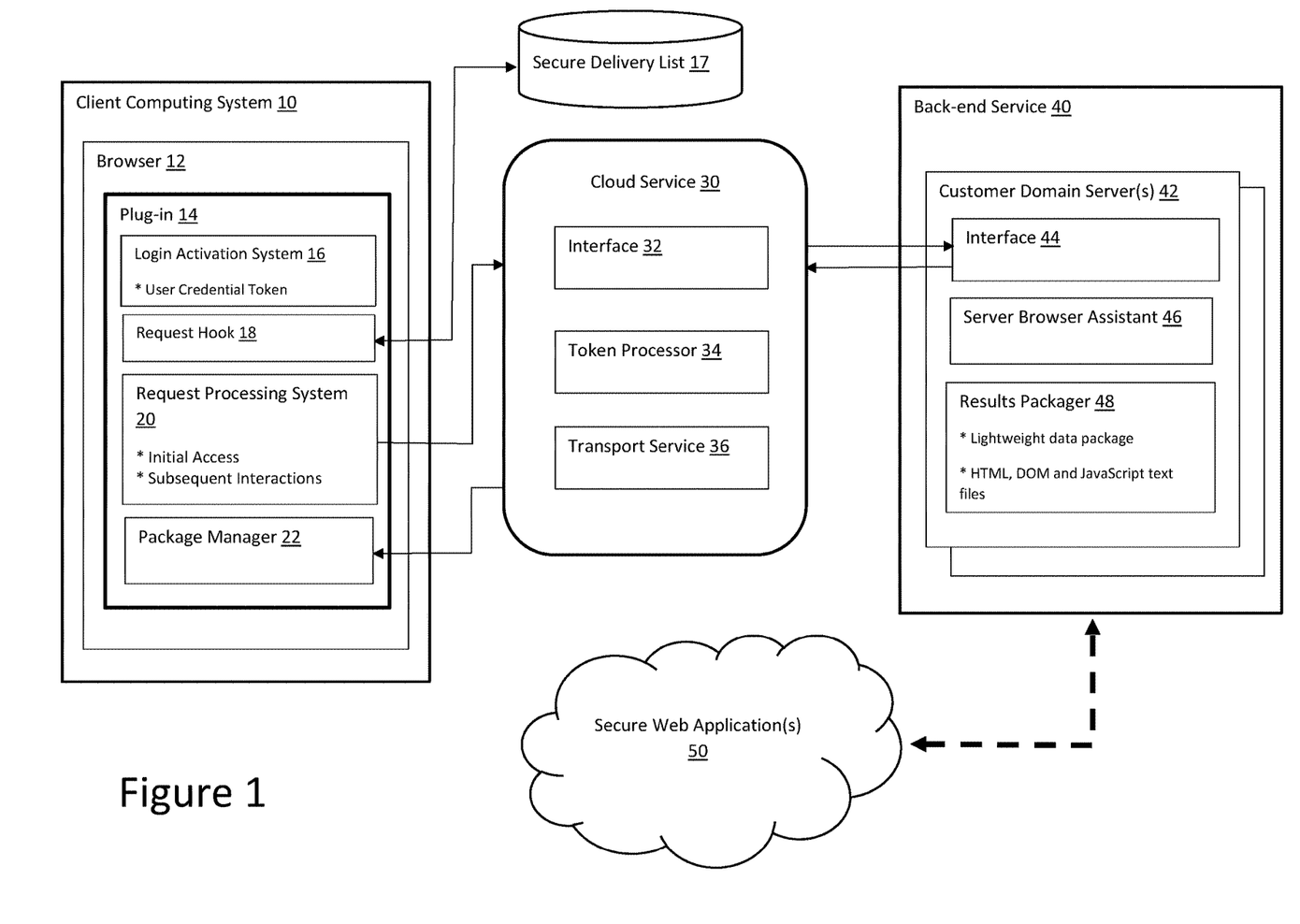
FIG. 1 is a block diagram of a network architecture for providing secure web application delivery, in accordance with an illustrative embodiment.

Referring to FIG. 1, an illustrative platform is shown that generally includes a client computing system 10 having a browser 12, a cloud service 30, and a back-end service 40. Client computing system 10 may comprises any computing system, smart device, appliance, etc., capable of running the browser 12. Browser 12 may comprise any application capable of accessing and viewing websites by rendering HTML (hypertext mark-up language) code, and which is capable of utilizing a plug-in 14 to extend functionality of the browser 12. For example, browser 12 may comprise any common browser application such as Google Chrome®, Mozilla Firefox®, Microsoft Edge®, Internet Explorer®, etc.

In this case, plug-in 14 provides specialized functionality for obtaining access to and rendering predetermined secure web applications 50. In particular, when a user points the browser 12 to a web application listed in a secure delivery list 17, the request is intercepted by a request hook 18 which causes request processing system 20 to redirect the request to the cloud service 30, which in turn forwards the request to a customer domain server 42 implemented by the back-end service 40. In order to access the specified secure web application, plug-in 14 first requires that the user be logged in via a login activation system 16, which recognizes the user and generates a user credential token that is forwarded with the request to the cloud service 30. Secure delivery list 17 may reside with the plug-in 14, or at a remote location such as within cloud service 30, back-end service 40, or other location. Request processing system 20 also determines if the request is an initial request to access the secure web application 50 or a subsequent interaction, as each may be handled differently. Requests may comprise AJAX calls, e.g., the initial request may comprise an AJAX call to load a secure web application. AJAX allows for asynchronous requests by the browser 12 that do not interfere with the display and behavior of the existing page. Subsequent interactions may for example include HTTP (hypertext transfer protocol) requests or non-HTTP requests.

Cloud service 30 generally includes: an interface 30 for receiving HTTP requests and returning a resulting data package associated with a secure web application 50; a token processor 34 for evaluating the user credential token and determining a corresponding customer domain server 42; and a transport service 36 that establishes and/or maintains a secure channel with the customer domain server 42.

Within the back-end service 40, one or more customer domain servers 42 may be provisioned, which, e.g., may implement a directory service for different customers built for Microsoft Windows domain networks. Each customer domain server 42 may for example include: an interface 44 for receiving requests from the cloud service 30 and returning results, a server browser assistant 46 that executes the request involving a secure web application, and a results packager 48 that captures the results of the executed request and generates a lightweight data package of text-based data ("data package") that, e.g., includes resulting Hypertext Markup Language (HTML), a Document Object Model (DOM), and JavaScript.

HTML is a standardized system for tagging text files to achieve font, color, graphic, and hyperlink effects on World Wide Web pages. A DOM is an application programming interface (API) for HTML, and defines a logical structure of an HTML document and how the document is accessed and manipulated. A DOM is generally implemented as a tree structure in which each node is an object representing a part of the document. In the current application, the DOM includes the structure and the style of the HTML elements for the web application, including the header, body, input and so on.

JavaScript (JS) is a high-level, interpreted programming language and is one of the core technologies of the World Wide Web. JavaScript enables interactive web pages and forms an element of web applications, allowing for website manipulation and event handling generated from user actions, e.g., scrolling, clicking, etc. The vast majority of websites use JavaScript and all major web browsers have a dedicated JavaScript engine to execute JavaScript code. JavaScript is generally included in or referenced by the HTML document for interpretation by the browser.

Server browser assistant 46 may for example employ a headless browser, which is a browser without a graphical user interface. Headless browsers provide automated control of a web page in an environment similar to traditional web browsers, but can be executed via a command-line interface or using network communication. Headless browsers are often used for testing web pages as they are able to render and understand HTML the same way a browser would, including styling elements such as page layout, color, font selection and execution of JavaScript, etc.

As noted, the resulting data package includes: HTML; a DOM; and JavaScript. The entire data package primarily only includes text data which can be easily transported and processed in a lightweight manner. Any image data or the like can for instance be transported through base64 encoding.

Once the data package is generated, the package is sent back to the browser 12 running on the client computing system 10 via the cloud service 30. A package manager 22 within the plug-in 14 may be employed to facilitate rendering the secure web application in the browser 12 based on the data package. Because the DOM and JavaScript are not encoded, the browser 12 can render the secure web application with little or no extra processing overhead. Note that in one embodiment, the resulting data package can be constructed to include only partial updates to a previous HTTP request, and an integration process can be employed to integrate current "partial" results with previous results to render an updated version of the web application.

Figure 2:
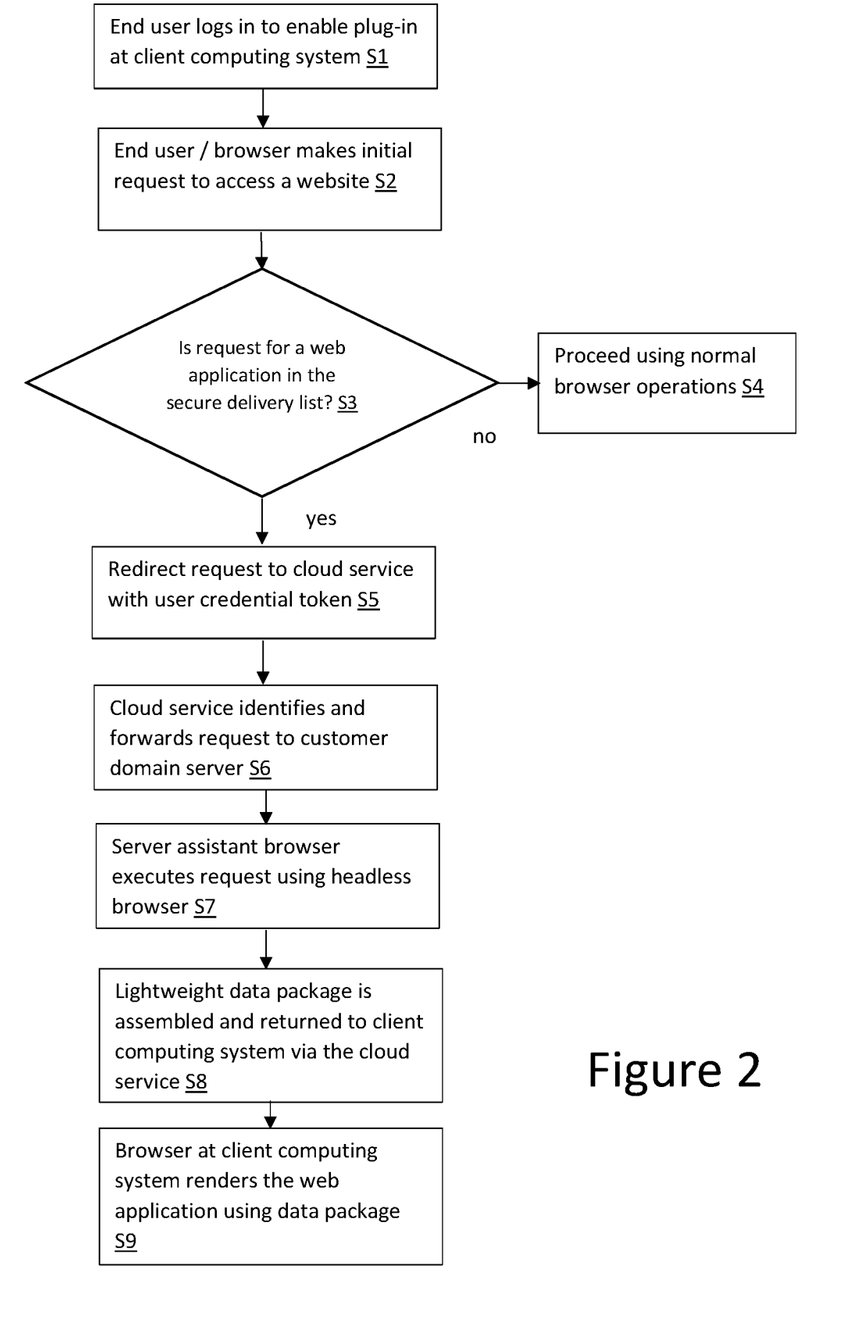
FIG. 2 is a flow diagram showing a process for handling an initial request to access a secure web application, in accordance with an illustrative embodiment.

FIG. 2 depicts a flow diagram of an illustrative process for implementing the platform of FIG. 1 in which browser 12 includes an integrated plug-in 14. At S1, the end user at the client computing system 10 logs into the login activation system 16 to enable the plug-in 14, which generates a user credential token. At S2, the end user makes an initial request to access a website via browser 12, and at S3 a determination is made by request hook 18 whether the request is for a secure web application in the secure delivery list 17. If the request is not for a secure web application, the browser processes the request in a normal fashion at S4. If the request is for a secure web application in the secure delivery list 17, then the request is redirected to cloud service 30 along with the user credential token at S5. At S6, the cloud service identifies a customer domain server 42 associated with the token and forwards the request thereto.

Once the request is received by the customer domain server 42, a server browser assistant 46 executes the request to access the secure web application using a headless browser at S7. A data package that includes the HTML, DOM and JavaScript is assembled by the results packager 48 and is returned to the client computing system 10 via the cloud service at S8. At S9, the browser 12 utilizes the data package to render the requested secure web application.

Figure 3:
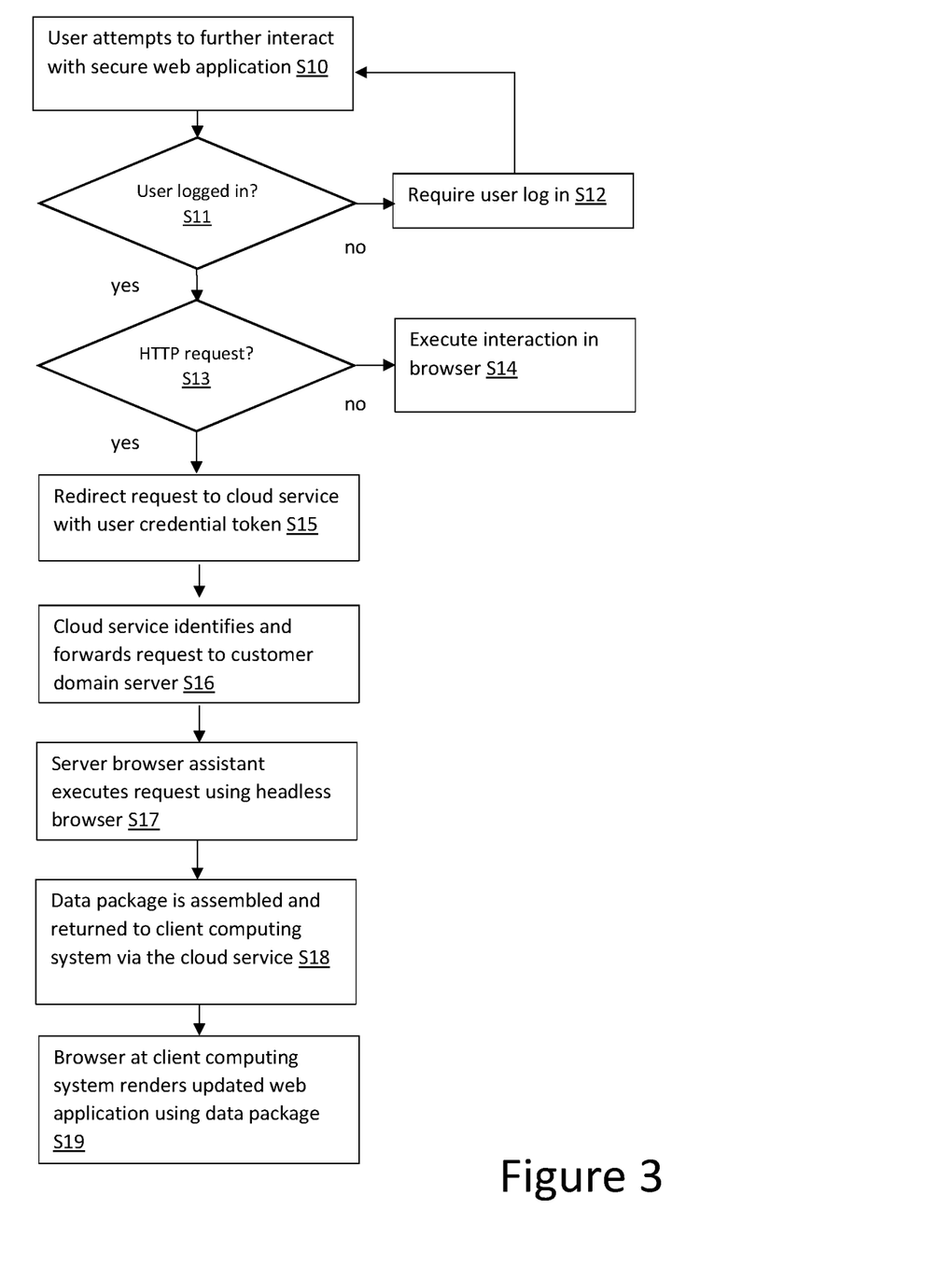
FIG. 3 is a flow diagram showing a process for handling subsequent requests to interact with the secure web application, in accordance with an illustrative embodiment.

FIG. 3 depicts a flow diagram of a process for handling further interactions with a previously loaded secure web application using the browser 12, and begins at S10 where the end user attempts further interactions. At S11, a check is made to ensure that the user is still logged into the login activation system 16. If the end user is no longer logged in, then the user is forced to log in at S12 and process repeats. If the end user is logged in, then a determination is made as to whether the interaction is an HTTP request at S13. If the interaction is not an HTTP request, e.g., the interaction involves scrolling or other functionality provided by the loaded JavaScript, then the interaction is executed within the browser at S14. If the interaction involves an HTTP request at S13, then the request is redirected to the cloud service 30 along with the user credential token at S15.

At S16, the cloud service 30 identifies the customer domain server 42 associated with the token and forwards the HTTP request thereto. Once the HTTP request is received by the customer domain server 42, the server assistant browser 46 executes the request to interact with the secure web application using the headless browser at S17. A resulting data package that includes updated HTML, DOM and JavaScript is assembled by the results packager 48 and is returned to the client computing system 10 via the cloud service at S18. At S19, the browser 12 utilizes the lightweight package to render the updated secure web application.

Note then when processing subsequent interactions for an already loaded secure web application, the generated data package may include an entirely new set of data or just updates to data in a previously sent package. This determination may for example depend on the business logic of the secure web application. For instance, if the handler to the HTTP request needs to update the entire website, then an entirely new package will be generated. If the handler to the HTTP request only needs to update parts of the website, then just update changes can be provide.

Figure 4:
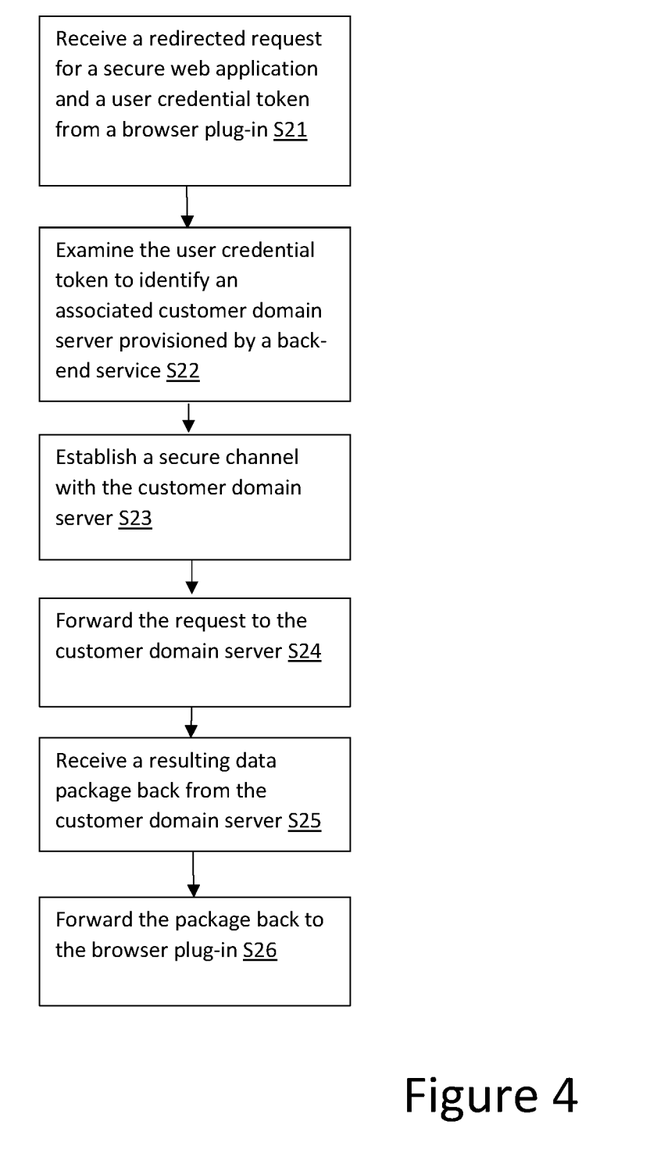
FIG. 4 depicts a flow diagram showing a cloud service process for handling redirected HTTP requests from a plug-in, in accordance with an illustrative embodiment.

FIG. 4 depicts a flow diagram of a process employed by the cloud service 30 to manage redirected requests. At S21, the cloud service 30 receives a user credential token and a redirected request for a secure web application from a browser plug-in 14. At S22, the user credential token is examined to identify an associated customer domain server 42 provisioned by a back-end service 40. At S23, a secure channel with the customer domain server 42 is established and at S24 the request is forwarded to the selected customer domain server 42. Next, at S25, a resulting data package containing HTML, a DOM and JavaScript is received back from the customer domain server 42 and forwarded to the browser plug-in at S26.

Cloud service 30 may for example be implemented by a cloud computing environment that employs a network of remote, hosted servers to manage, store and/or process data, and may generally be referred to, or fall under the umbrella of, a "network service." The cloud computing environment may include a network of interconnected nodes, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Each of the client computing system 10, cloud service 30 and back-end service 40 may comprise any type of computing device that for example includes at least one processor, memory, an input/output (I/O), e.g., one or more I/O interfaces and/or devices, and a communications pathway or bus. In general, the processor(s) execute program code which is at least partially fixed in memory. While executing program code, the processor(s) can process data, which can result in reading and/or writing transformed data from/to memory and/or I/O for further processing. The pathway provides a communications link between each of the components in the computing device. I/O can comprise one or more human I/O devices, which enable a user to interact with the computing device and the computing device may also be implemented in a distributed manner such that different components reside in different physical locations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A network service, comprising:
    an interface configured to receive a request for a secure web application from a plug-in integrated into a web browser on a client computing device, wherein the request further includes a user credential token;
    a token processor that evaluates the user credential token and selects a customer domain server corresponding to the user credential token from a set of customer domain servers provided by a back-end service; and
    a transport service that establishes a secure channel with the selected customer domain server, forwards the request to the selected customer domain server, and receives back a text-based data package from the selected customer domain service;
    wherein the text-based data package is forwarded to the plug-in in response to the request.

2. The network service of claim 1, wherein the text-based data package includes HTML (Hypertext markup language), a DOM (document object model) and JavaScript that can be utilized by the web browser to render the secure web application.

3. The network service of claim 1, wherein the DOM includes styles associated with a DOM tree.

4. The network service of claim 1, further comprising a list of secure web applications that cause the plug-in to redirect requests.

5. The network service of claim 1, wherein the interface is further configured to receive an HTTP request from the plug-in for a subsequent interaction with the secure web application, wherein the HTTP request includes the user credential token.

6. The network service of claim 5, wherein the transport service forwards the HTTP request to the selected customer domain server and receives back an updated text-based package from the selected customer domain server.

7. The network service of claim 6, wherein the updated text-based package back is forwarded back to the plug-in.

8. A computer program product stored on a non-transitory computer readable medium, which when executed by a processor implements a network service, the program product comprising:
    program code configured to receive a request for a secure web application from a plug-in integrated into a web browser on a client computing device, wherein the request further includes a user credential token;
    program code that evaluates the user credential token and selects a customer domain server corresponding to the user credential token from a set of customer domain servers provided by a back-end service; and
    program code that establishes a secure channel with the selected customer domain server, forwards the request to the selected customer domain server, and receives back a text-based data package from the selected customer domain server;

wherein the text-based data package is forwarded to the plug-in in response to the request.

9. The computer program product of claim 8, further comprising a list of secure web applications that cause the plug-in to redirect requests.

10. The computer program product of claim 8, wherein the text-based data package includes HTML (Hypertext markup language), a DOM ( document object model) and JavaScript that can be utilized by the web browser to render the secure web application.

11. The computer program product of claim 10, wherein the DOM includes styles associated with a DOM tree.

12. The computer program product of claim 8, further comprising program code configured to receive an HTTP request from the plug-in for a subsequent interaction with the secure web application, wherein the HTTP request includes the user credential token.

13. The computer program product of claim 12, further comprising program code configured to forward the HTTP request to the selected customer domain server and receive back an updated text-based package from the selected customer domain server.

14. The computer program product of claim 13, wherein the updated text- based package is forwarded back to the plug-in.

15. A computerized method of utilizing a network service, comprising:

receiving a request for a secure web application from a plug-in integrated into a web browser on a client computing device;

receiving a user credential token with the request;

evaluating the user credential token to select a customer domain server corresponding to the user credential token from a set of customer domain servers provided by a back-end service;

establishing a secure channel with the selected customer domain server and forwarding the request to the selected customer domain server;

receiving back a text-based data package from the selected customer domain server; and forwarding the text-based data package to the plug-in in response to the request.

16. The computerized method of claim 15, wherein the text-based data package includes HTML (Hypertext markup language), a DOM (document object model) and JavaScript that can be utilized by the web browser to render the secure web application.

17. The computerized method of claim 16, wherein the DOM includes styles associated with a DOM tree.

18. The computerized method of claim 15, further comprising receiving an HTTP request from the plug-in for a subsequent interaction with the secure web application, wherein the HTTP request includes the user credential token.

19. The computerized method of claim 18, further comprising forwarding the HTTP request to the selected customer domain server and receiving back an updated text-based package from the selected customer domain server.

20. The computerized method of claim 19, further comprising forwarding the updated text-based package back to the plug-in.

* * * * *